United States Patent [19]
Aono et al.

[11] 3,898,894
[45] Aug. 12, 1975

[54] ENGINE IGNITION TIMING CONTROL

[75] Inventors: Shigeo Aono, Tokyo; Norio Mizuguchi, Yokosuka, both of Japan

[73] Assignee: Nissan Motor Company Limited, Yokohama, Japan

[22] Filed: Nov. 19, 1973

[21] Appl. No.: 416,835

[30] Foreign Application Priority Data
Nov. 20, 1972 Japan.............................. 47-116327

[52] U.S. Cl................ 74/866; 74/856; 123/117 R; 123/117 A; 123/148 E
[51] Int. Cl.......................... B60k 23/00; F02p 5/08
[58] Field of Search ............ 74/866, 860, 851, 856; 123/117 A, 117 R, 148 E

[56] References Cited
UNITED STATES PATENTS

| | | | |
|---|---|---|---|
| 3,626,455 | 12/1971 | Toda..................... | 74/860 |
| 3,718,126 | 2/1973 | Oishi et al..................... | 123/117 R |
| 3,738,339 | 6/1973 | Huntzinger et al. ........ | 123/117 A X |
| 3,749,073 | 7/1973 | Asplund..................... | 123/117 R X |
| 3,792,630 | 2/1974 | Hause................................ | 74/860 |

*Primary Examiner*—Samuel Scott
*Assistant Examiner*—P. S. Lall

[57] ABSTRACT

A system for controlling an ignition spark timing in dependence on varying operating conditions of an internal combustion engine and gear ratios of a power transmission of a motor vehicle. The system comprises a logic circuit arranged to produce logic signals in dependence on engine speed, gear ratio of the power transmission, engine temperature, throttle opening of an air induction system and intake manifold vacuum. The logic signals are supplied to a function generating unit which generates signals as functions of the logic signals and produces an output signal by summing the generated signals. A control circuit produces a pulse signal with a repetition rate proportional to the engine speed. The control circuit responds to the output signal from the function generating unit for modulating the pulse width of the pulse signal in dependence thereon to provide an optimum ignition timing throughout the varying operating conditions of the engine.

2 Claims, 6 Drawing Figures

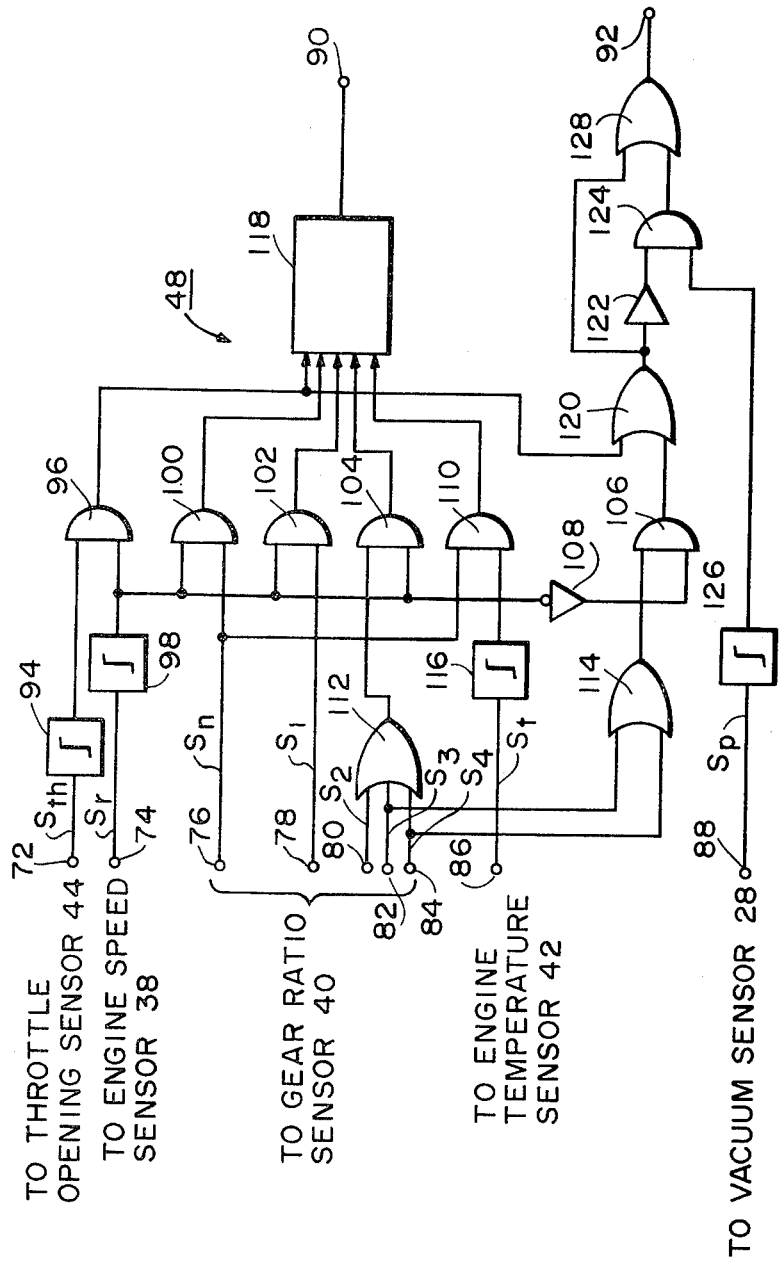

ENGINE IGNITION TIMING CONTROL

This invention relates to gasoline-powered internal combustion engines for motor vehicles and, more particularly, to an ignition spark timing control system for controlling ignition spark timing in dependence on various operating conditions of such engines.

In a conventional ignition spark timing control system for a gasoline-powered internal combustion engine, it has been a common practice to utilize engine load as represented by intake manifold vacuum of the engine and engine speed as parameters for controlling spark timing to obtain maximum performance efficiency of the engine. In this prior method, the ignition timing is usually adjusted to provide a maximum power output at full engine load and a minimum fuel consumption at light engine load. The ignition timing adjusted in this manner, however, is inappropriate from the view point of reducing the formation of harmful compounds in engine exhaust gases emitted to the atmosphere.

It is, therefore, an object of the present invention to provide an ignition spark timing control system for a vehicle engine which reduces the formation and subsequent emission of poisonous compounds in exhaust gases without adversely affecting the performance efficiency of the engine.

It is another object of the present invention to provide an ignition spark timing control system for a vehicle engine which is arranged to provide an optimum spark timing throughout varying operating conditions of the engine.

It is another object of the present invention to provide an ignition spark timing control system for a gasoline-powered internal combustion engine of a motor vehicle which system controls spark timing in dependence on engine intake manifold vacuum, engine speed, throttle opening of an air induction system, engine temperature and gear ratio of a vehicle power transmission.

These and other features and advantages of the present invention will become more apparent from the following description when taken in conjunction with the accompanying drawings, in which:

FIG. 6 is a schematic diagram of a logic circuit forming a part of the system shown in FIG. 5.

Figure 1:
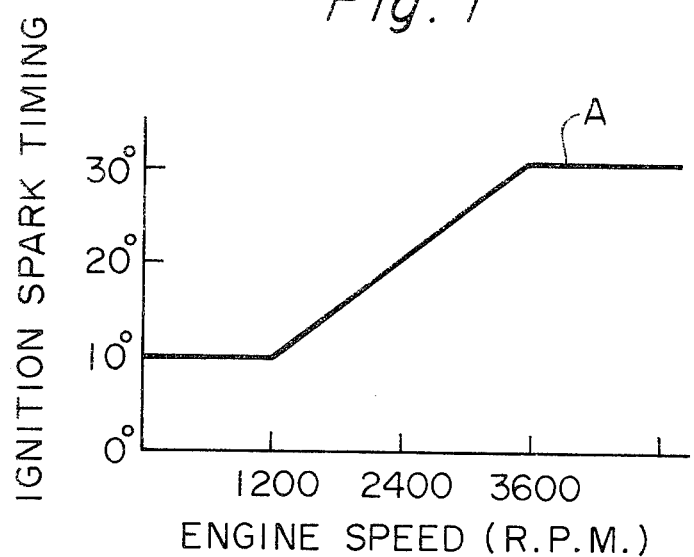
FIG. 1 is a graph showing an example of the advancing values of an ignition spark timing obtained by a prior art centrifugal advance mechanism.
Figure 2:
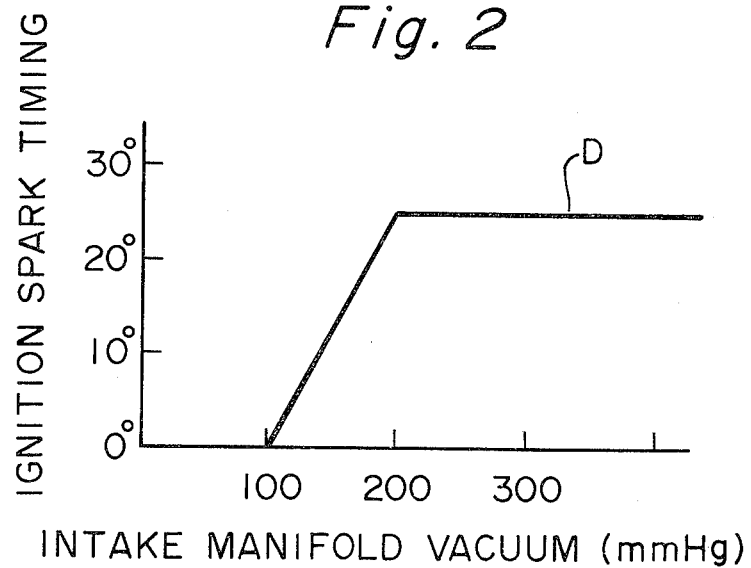
FIG. 2 is a graph showing an example of the advancing values of an ignition spark timing determined by a prior art vacuum advance mechanism.

Referring now to FIGS. 1 and 2 of the drawings, there are shown typical examples of the centrifugal and vacuum advancing values of ignition spark timing which are represented by curves A and D, respectively. The centrifugal advance curve A represents the variations in spark advance which is regulated by a conventional centrifugal advance mechanism, while the vacuum advance curve D represents the variations in spark advance which is regulated by a vacuum advance mechanism. It is well known that the centrifugal and vacuum advance mechanisms are combined to provide a total amount of spark advance resulting from concurrent operation of these two mechanisms. As seen from the curve A, the centrifugal advance mechanism is so arranged that it provides about 10° of spark advance at engine idling or low speed condition the advance increasing to 30° at high speed, e.g., at 3,600 r.p.m. The vacuum advance mechanism is so arranged that it provides no spark advance at the level of 100 mmHg vacuum while providing up to 30° of spark advance at the level of 200 mmHg. If, accordingly, the throttle valve is only partly opened at a given engine speed, the intake manifold vacuum is relatively high and, thus, an additional spark advance of certain degrees may be obtained.

In order to considerably reduce formation of noxious compounds in engine exhaust gases without imparing the performance efficiency of the engine and fuel economy throughout the varying operating conditions of the engine, it is necessary to modify ignition timing in dependence on other parameters such as engine temperature, gear ratio of a vehicle power transmission, and throttle opening etc. However, it is quite difficult to provide a mechanical device which is capable of controlling the ignition spark timing in dependence on the above mentioned parameters in combination thereof so as to meet the various requirements.

The present invention contemplates to provide an electronically controlled ignition spark timing control system to reduce the formation of harmful compounds in the engine exhaust gases without imparing the engine performance efficiency. In order to achieve this end, the present invention features the provision of different modes of advancing and retarding characteristics of the ignition spark timing by which the ignition spark timing under given engine operating conditions is determined in dependence on the relative values of sensed oprating parameters.

Figure 3:
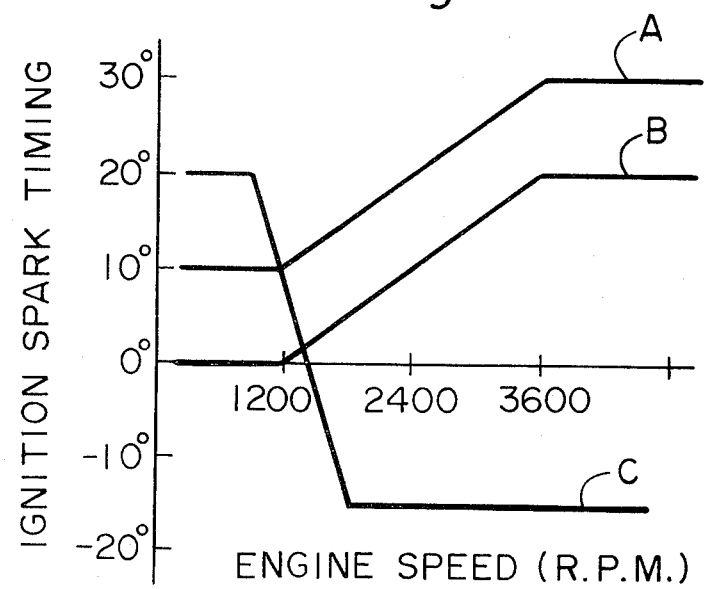
FIG. 3 is a graph illustrating a preferred example of advancing and retarding values of ignition spark timing obtained by an ignition spark timing control system according to the present invention.
Figure 4:
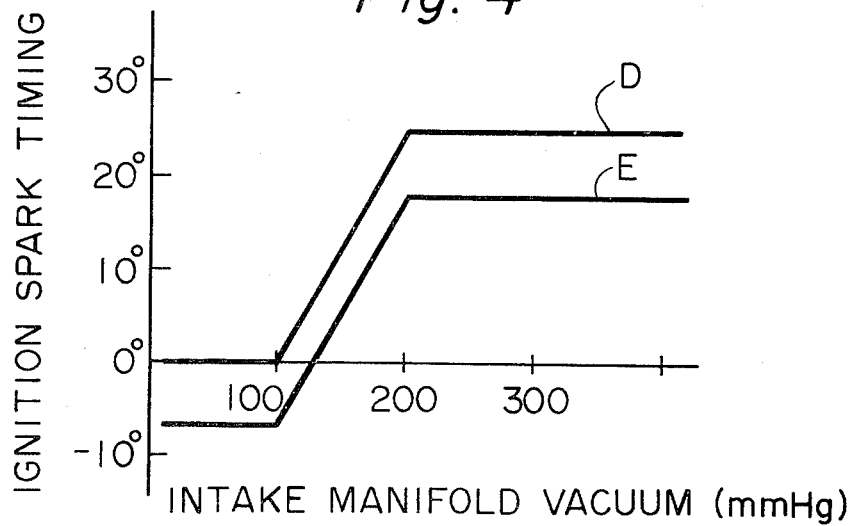
FIG. 4 is a graph illustrating a preferred example of the advancing and retarding characteristics of ignition timing attained by an ignition spark timing control system of the present invention.

A preferred example of the advancing and retarding values of the ignition spark timing is illustrated in FIGS. 3 and 4, wherein characters A and D indicate normal centrifugal and vacuum advance curves already discussed hereinabove. In FIG. 3, a curve B represents a centrifugal advancing value which is less advanced than the normal centrifugal advance represented by the curve A. Following the curve B, the ignition timing is set to provide no spark advance where the engine speed is around 1200 r.p.m. while providing 20 of spark advance where the engine speed is 3600 r.p.m. A curve E represents the vacuum advancing value which is less advanced than the normal vacuum advance which is indicated by the curve D. Following the curve E, the ignition timing is retarded about 8 degrees after T.D.C. where the intake manifold vacuum is around 100 mmHg while the spark advance is about 18° where the intake manifold vacuum is around 200 mmHg. A curve C illustrates a centrifugal advance value of the ignition spark timing at low engine speed, the advance changing to spark retard as the engine speed increases. More specifically, the curve C indicates a 20° spark advance where the engine speed is around 800 r.p.m while a retard of 15° is indicated where the engine speed is about 1800 r.p.m. The different modes of the advancing and retarding characteristics of the ignition spark timing are selected by an ignition spark timing control system proposed by the present invention in dependence on the sensed, engine operating parameters. Since, for example, the concentration of nitrogen oxides in the engine exhaust gases is high when the engine is operating at high speed and high load and the amount of nitrogen oxides can be reduced by advancing the ignition spark timing, means are provided for controlling to a lesser degree the ignition spark timing at high engine speed and high engine load, namely, when the engine speed exceeds, e.g., 2000 rmp where the vehicle power transmission is set to its second, third or fourth forward gear ratio based on a definite degree of lesser spark advance resulting from the curves B and E shown in FIGS. 3 and 4, respectively.

After starting a cold engine, it is desirable to rapidly warm up the engine. Since rapid warming up of the engine is achieved by retarding the ignition spark timing, the ignition spark timing control system of the present invention provides an ignition spark timing derived from the centrifugal and vacuum advance curves C and D in response to electric signals representing a low engine speed, neutral condition of the vehicle power transmission and low engine temperature. When the motor vehicle starts to move before complete warming-up of the engine, increased power is demanded of the engine so that the normal centrifugal and vacuum advancing values represented by the curves A and D are combined to provide an ignition spark timing based thereon by shutting off the electric signal representing the transmission being set into its neutral condition.

When the engine is used for braking the vehicle e.g. during a descent, it is necessary to advance the ignition spark timing less in order to facilitate the combustion efficiency of the engine to reduce formation of harmful compounds in the engine exhaust gases. This is accomplished by providing an ignition spark timing in accordance with the centrifugal and vacuum advancing values indicated by the curves B and E in dependence on the electric signals representing a closed throttle valve and the engine speed reaching a relatively high level.

A preferred example of varying the ignition spark timing for engine operating modes is illustrated in the following table:

| Gear Ratio Engine Mode | Neutral | First forward | Second forward | Third forward | Fourth forward |
| --- | --- | --- | --- | --- | --- |
| Low speed | A + D | A + D | A + D | A + E | A + E |
| High speed | A + D | A + E | B + D | B + D | B + D |
| Warm-up | C + D | A + D | A + D | A + D | A + D |
| Engine braking | B + E | B + E | B + E | B + E | B + E |

Figure 5:
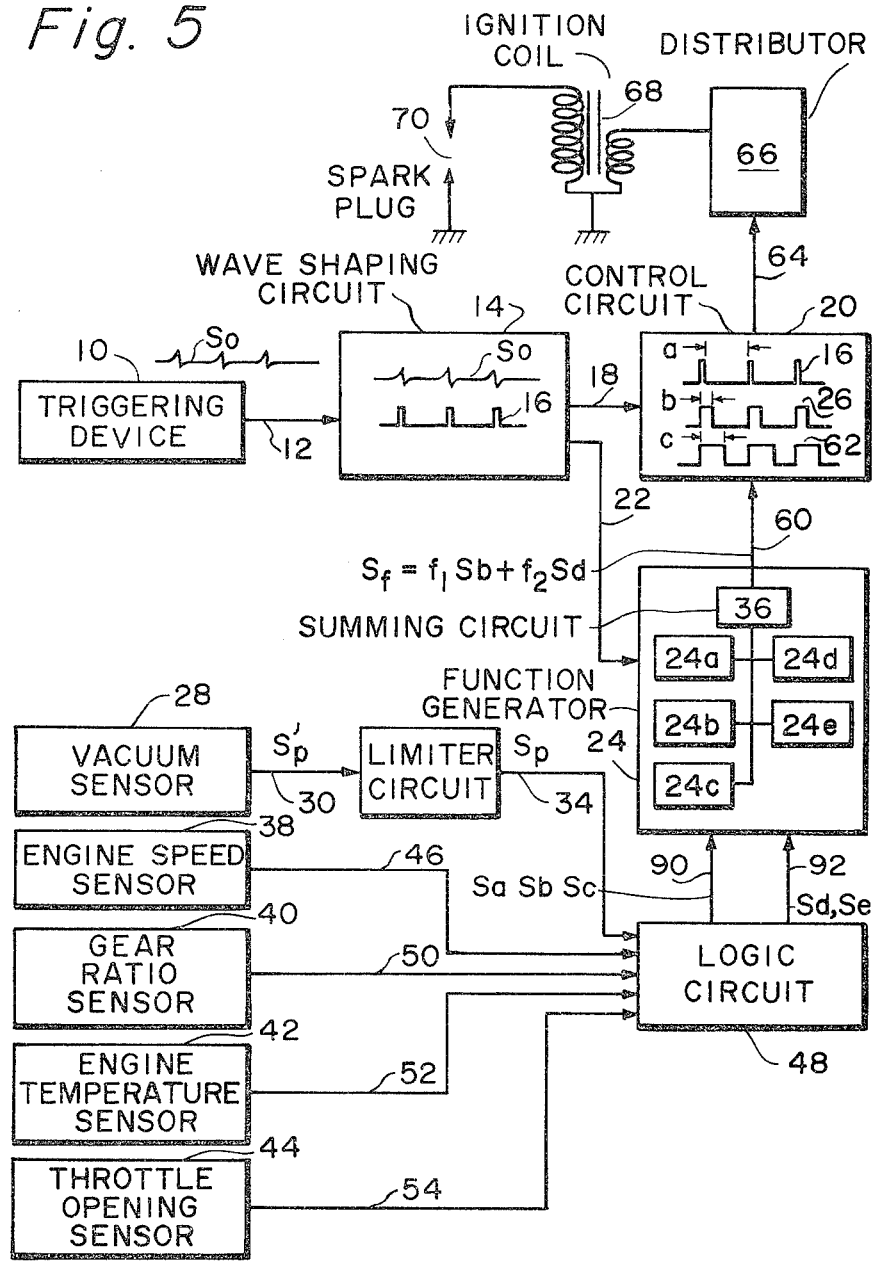
FIG. 5 is a schematic diagram of an ignition spark timing control system according to the present invention.

Referring now to FIG. 5, there is shown a preferred embodiment of an ignition spark timing control system according to the present invention. The illustrated ignition spark timing control system of the present invention is specifically suited for use in a gasoline-powered internal combustion engine of a motor vehicle which has a power transmission. The ignition spark timing control system comprises a triggering device 10 which may be of any suitable construction insofar as it functions to produce a pulse signal with a repetition rate proportional to engine speed, i.e., the rotational speed of the engine crankshaft. The pulse signal, indicated by $S^o$, is fed through a line 12 to a wave shaping circuit 14, where the pulse signal $S^o$ is converted into a rectangular pulse signal 16. This rectangular pulse signal 16 is applied as an input through a line 18 to a control circuit 20 and through a line 22 to a function generating unit 24 which will be described hereinafter in detail. The control circuit 20 is arranged to produce a pulse signal 26 with the width $b$ less than the pulse spacing $a$ of the input pulse signal 16. Both signals 16 and 26 have the same repetition rate.

The function generating unit 24 includes a plurality of signal generating circuits $24a$, $24b$, $24c$, $24d$ and $24e$ incorporated therein which are responsive to the pulse signal 16 from the wave shaping circuit 14 and to the analog voltage signal $S_p$ from the limiter circuit 32 and generate the plurality of voltage signals corresponding to the centrifugal and vacuum advancing characteristics represented by the curves A, B, and C in FIG. 3 and curves D and E in FIG. 4. These function generating circuits are well known to those skilled in the art and, therefore, a detail description of the same is herein omitted. The function generating unit 24 also includes a summing circuit 36 which is connected to the function generating circuits $24a$, $24b$, $24c$, $24d$ and $24e$.

The ignition spark timing control system also comprises a vacuum sensor 28 which senses the engine intake manifold vacuum and produces an analog voltage signal representative thereof. The analog voltage signal, indicated at $S'_p$ is supplied through a line 30 to a limiter circuit 32 where noises in the analog voltage signal $S'_p$ are cut off to produce another analog voltage signal $S_p$ representing the intake manifold vacuum of the engine. This signal $S_p$ is applied through a line 34 to a logic circuit 48.

The ignition timing control system further comprises an engine speed sensor 38, a gear ratio sensor 40, an engine temperature sensor 42 and a throttle opening sensor 44. The engine speed sensor 38 senses engine speed and produces an analog voltage signal in dependence thereon, which is applied through a line 46 to the logic circuit 48. The gear ratio sensor 40 senses the gear ratio of the vehicle power transmission and produces a prevailing gear ratio indicating analog signal. This signal is delivered through a line 50 to the logic circuit 48. The engine temperature sensor 42 senses the engine temperature, for example, the temperature of the water jacket of the engine and produces an analog voltage signal dependent thereon. This signal is supplied through a line 52 to the logic circuit 48. The throttle opening sensor 44 senses the degree of opening of a throttle valve of an induction system of the engine and produces an analog voltage signal in dependence thereon, which is delivered through a line 54 to the logic circuit 48. The logic circuit 48 is thus supplied with various analog voltage signals representing varying engine operating conditions and gear ratio indicating signals and produces a first set of logic output signals $S_a$, $S_b$, $S_c$, and a second set of logic output signals $S_d$ and $S_e$. The first set of logic output signals $S_a$, $S_b$ and $S_c$ is fed through a line 90 to the function generating unit 24, to which the second set of logic output signals $S_d$ and $S_e$ is also supplied through a line 92. It will be appreciated that the logic output signals regarding the centrifugal spark advance appear at the line 90 while the logic output signals regarding the vacuum advance appear at the line 92.

If, for example, the engine is operating at high speed while the vehicle power transmission is set into its fourth gear ratio (see Table), then the logic circuit 48 produces the logic output signals $S_b$ and $S_d$ at the outputs thereof. These signals $S_b$ and $S_d$ are fed to the function generating unit 24 through the lines 90 and 92, respectively, and the function generating unit 24 causes the function generating circuits $24_b$ and $24_d$ to operate in response to the logic output signals $S_b$ and $S_d$ for producing output signals as functions of $S_b$ and $S_d$ and representing the curves B and D in FIGS. 3 and 4. These output signals $f_1Sb$ and $f_2Sd$ are fed to the summing circuit 36, in which they are summed to produce an output signal $S_f = f_1Sb + f_2Sd$. This output signal $S_f$ is then supplied through a line 60 to the control circuit 20, which produces an output pulse signal 62 having a pulse width C modulated from the pulse width $b$ of the pulse signal 26 in dependence on the output signal $S_f$. The output pulse signal 62 is then supplied through a line 64 to a distributor 66 which is connected through an ignition coil 68 to a spark plug 70 of the engine.

FIG. 6 illustrates a preferred example of the logic circuit shown in FIG. 5. As shown, the logic circuit 48 includes a plurality of inputs 72, 74, 76, 78, 80, 82, 84, 86 and 88, and outputs 90 and 92. The input 72 is connected to the throttle opening sensor 44 to receive an analog signal $S_{th}$ therefrom. The input 74 is connected to the engine speed sensor 38 to receive an analog signal $S_r$ therefrom. The inputs 76 to 84 are connected to the gear ratio sensor 40 to receive a neutral, first, second, third or fourth gear ratio analog signal $S_n$, $S_1$, $S_2$, $S_3$ or $S_4$ therefrom. The input 86 is connected to the engine temperature sensor 42 to receive an analog signal $S_t$ therefrom. The input 88 is connected to the vacuum sensor to receive an analog signal $S_p$ therefrom. The outputs 90 and 92 are connected to the function generating unit 24 and deliver the logic output signals thereto.

The input 72 is connected through a first comparator 94 to a first AND gate 96, to which the input 74 is also connected through the comparator 98 to second, third and fourth AND gates 100, 102 and 104 and is further connected to a sixth AND gate 106 through the comparator 98 and an inverter 108. The input 76 is connected and the AND gate 100 and also to a fifth AND gate 110. The input 78 is connected to the AND gate 102. The inputs 80, 82 and 84 are connected to a first OR gate 112, which is connected at its output to the AND gate 104. The inputs 82 and 84 are also connected to a second OR gate 114, which in turn is connected to the AND gate 106. The input 86 is connected through a third comparator 116 to the AND gate 110. As shown, the outputs of the AND gates 96, 100, 102, 104 and 110 are connected to a logical product circuit 118 having its output connected to the output 90 of the logic circuit 48. The AND gate 106 is connected at its output to a third OR gate 120, to which the output of the AND gate 96 is also connected. The OR gate 120 is connected at its output through an inverter 122 to a seventh AND gate 124, to which the input 88 is also connected through a fourth comparator 126. The output of the OR gate 120 is further connected to a fourth OR gate 128, to which the output of the AND gate 124 is also connected. The output of the OR gate 128 is connected to the output 92 of the logic circuit 48.

If, in operation, the engine is operating at high speed while the vehicle power transmission is set in its fourth gear ratio, the throttle opening is large and the engine speed is high the analog signals $S_{th}$ and $S_r$ reach high levels, respectively. The analog signal $S_{th}$ is compared with a reference voltage in the comparator 94, which generates an output 1 because of the high level of the input signal $S_{th}$. The output 1 is then delivered to the AND gate 96. In the same manner, the analog signal $S_r$ is compared with a reference voltage in the comparator 98, from which an output 1 is produced because the input signal $S_r$ is at a high level. The output 1 of the comparator 98 is also supplied to the input of the AND gate 96, which consequently produces an output 1 at its output terminal. At the same time, the gear ratio sensor 40 produces a fourth gear signal $S_4$ at the input 84, from which the signal $S_4$ is supplied to the OR gate 112, which consequently produces an output 1 which is delivered to the AND gate 104. In this instance, the AND gate 104 also receives the output 1 from the comparator 98 connected to the input 74, so that the AND gate 104 produces an output 1 at its output terminal. The outputs 1 from the AND gates 96 and 104 are then supplied to the logical product circuit 118, where a logic output signal $S_b$ is produced. In the meantime, the signal $S_4$ appearing at the input 84 is also supplied to the OR gate 114, which consequently produces an output 1 which is supplied to the AND gate 106. In this instance, the output 1 from the comparator 98 is delivered to the inverter 108, where the output 1 is inverted to an output 0. Thus, the AND gate 106 receives the output 1 and the output 0 from the OR gate 114 and the inverter 108, respectively, so that the AND gate 106 produces an output 0. This output 0 is then supplied to the OR gate 120, which also receives the output 1 from the AND gate 96 to produce an output 1. The output 1 from the OR gate 120 is supplied to the inverter 122, where the output 1 is inverted to an output 0 which is supplied to the AND gate 124. At this instant, although the vacuum sensor 28 produces an analog signal $S_p$ which is supplied from the input 88 to the comparator 126, the signal $S_p$ is at a low level when the engine is operating under high load so that an output 0 appears at the output terminal of the comparator 126. The output 0 is delivered to the AND gate 124, to which the output 0 is also supplied from the inverter 122. Thus, the AND gate 124 produces an output 0, which together with the output 1 from the OR gate 120 is fed to the OR gate 128 and, thus, an output 1 is produced at the output of the OR gate 128 which corresponds to the logic output signal $S_d$. It will thus be seen that, during high speed and high load operating conditions of the engine, the logic circuit 48 produces logic output signals $S_b$ and $S_d$ which are respectively supplied through the lines 90 and 92 to the function generating unit 24. Then, the function generating unit 24 causes the function generating circuits $24b$ and $24d$ to operate. Accordingly, the function generating unit 24 produces signals $f_1Sb$ and $f_2Sd$ which are summed in the summing circuit 36 to produce an output signal $S_f = f_1Sb + f_2Sd$, which is supplied to the control circuit 20 through the line 60 (see FIG. 5). The timing pulse 62 dependent on the signal $S_f$ is produced by the control circuit 20. It should thus be understood that, when the engine is operated at high speed while the vehicle power transmission is in its fourth gear ratio, the ignition timing is provided in dependence on the curves B and D shown in FIGS. 3 and 4, respectively. The logic circuit 48 shown in FIG. 6 operates in a similar manner when the engine is operated under other conditions and, therefore, detail description of the operation of the logic circuit is herein omitted for the sake of simplicity.

It will now be appreciated from the foregoing description that the ignition spark timing control system of the present invention is capable of providing ignition spark timings which are optimum for respective engine operating conditions and accordingly the formation of harmful compounds in engine exhaust gases is greatly reduced without imparing the engine performance efficiency.

What we claim is:

1. An ignition spark timing control system for an internal combustion engine of a motor vehicle equipped with a power transmission comprising, in combination, an engine speed sensor to sense engine speed and to produce an analog signal dependent on said engine speed, a gear ratio sensor to sense a plurality of gear ratios of said power transmission and to produce a plurality of analog signals each representing one of said gear ratios of said power transmission, an engine temperature sensor to sense engine temperature and to produce an analog signal dependent on said engine temperature, a throttle opening sensor to sense throttle opening in an air induction system of said engine and to produce an analog signal dependent thereon, a vacuum sensor to sense vacuum in the engine intake manifold and to produce an analog signal dependent thereon, a logic circuit connected to said engine speed sensor, said gear ratio sensor, said engine temperature sensor, said throttle opening sensor and said vacuum sensor for producing logic output signals in dependence on said signals from said sensors, a function generating unit connected to said logic circuit and including a plurality of function generating circuits and a summing circuit connected thereto for generating signals as functions of said logic output signals, said function generating unit also including means for generating a function generating unit output signal, a triggering device for producing a pulse signal with a repetition rate proportional to said engine speed, a control circuit connected to said function generating unit and said triggering device, said control circuit comprising means for generating an output pulse signal having a pulse width less than the pulse spacing and a repetition rate of said pulse signal from said triggering device and means for modulating the pulse width of said output pulse signal from said control circuit in dependence on said function generating unit output signal, and ignition means connected to said control circuit for effecting ignition in said engine in response to the modulated output pulse signal.

2. An ignition spark timing control system for an internal combustion engine of a motor vehicle equipped with a power transmission comprising, in combination, an engine speed sensor to sense engine speed and to produce an anlog signal dependent on said engine speed, a gear ratio sensor to sense a plurality of gear ratios of said power transmission and to produce a plurality of analog signals each representing one of said gear ratios of said power transmissions, an engine temperature sensor to sense engine temperature and to produce an anlog signal dependent on said engine temperature, a throttle opening sensor to sense throttle opening in an air induction system of said engine and to produce an analog signal dependent thereon, a vacuum sensor to sense vacuum in the engine intake manifold and to produce an analog signal dependent thereon, a logic circuit including a first AND gate having inputs connected to said throttle opening sensor and said engine speed sensor through first and second comparators, respectively, a second AND gate having inputs connected to said second comparator and said gear ratio sensor, said second AND gate receiving a gear ratio signal representing neutral condition of said power transmission, a third AND gate having inputs connected to said second comparator and said gear ratio sensor, said third AND gate receiving a gear ratio signal representing a first gear ratio in said power transmission, a first OR gate having inputs connected to said gear ratio sensor and receiving gear ratio signals representing a second gear ratio, third gear ratio and fourth gear ratio in said power transmission, a fourth AND gate having inputs connected to said second comparator and an output of said first OR gate, a fifth AND gate having inputs connected to said engine temperature sensor through a third comparator and to said gear ratio sensor through a third comparator and to said gear ratio sensor, said fifth AND gate receiving said gear ratio signal representing said neutral condition of said power transmission, a second OR gate having inputs connected to said gear ratio sensor and receiving one of said third and fourth gear ratio signals therefrom, a sixth AND gate having inputs connected to said second comparator through an inverter and an output of said second OR gate, a logical product circuit connected to outputs of said first, second, third, fourth and fifth AND gate to produce a first set of logic signals at its output which is connected to one input of a function generating circuit, a third OR gate having inputs connected to the outputs of said first AND gate and the output of said sixth AND gate, a seventh AND gate having inputs connected through an inverter to the output of said third OR gate and said vacuum sensor through a fourth comparator, and a fourth OR gate having inputs connected to the output of said third OR gate and the output of said seventh AND gate to produce a second set of logic signals at its output which is connected to another input of said function generating unit, said function generating unit connected to said logic circuit comprising means for generating signals as functions of said logic signals and means to generate a function generating output signal, a triggering device for producing a pulse signal with a repetition rate proportional to said engine speed, a control circuit connected to said function generating unit and said triggering device, said control circuit comprising means for generating an output pulse signal having a pulse width less than the pulse spacing and a repetition rate of said pulse signal from said triggering device and means for modulating the pulse width of said output pulse signal from said control circuit in dependence on said function generating unit output signal, and ignition means connected to said control circuit for effecting ignition in said engine in response to the modulated output pulse signal.

* * * * *